US009226592B2

(12) United States Patent
Lin

(10) Patent No.: US 9,226,592 B2
(45) Date of Patent: Jan. 5, 2016

(54) FIXING DEVICE FOR CHAIRS

(71) Applicant: SPEC SEATS TECHNOLOGIES INC., Chung-Li, Taoyuan Hsien (TW)

(72) Inventor: Mei Chuen Lin, Chung-Li (TW)

(73) Assignee: SPEC SEATS TECHNOLOGIES INC., Chung-Li (TW)

( * ) Notice: Subject to any disclaimer, the term of this patent is extended or adjusted under 35 U.S.C. 154(b) by 79 days.

(21) Appl. No.: 14/282,446

(22) Filed: May 20, 2014

(65) Prior Publication Data

US 2015/0335169 A1 Nov. 26, 2015

(51) Int. Cl.
*A41F 1/00* (2006.01)
*A47C 31/00* (2006.01)
*F16B 2/06* (2006.01)

(52) U.S. Cl.
CPC .. *A47C 31/00* (2013.01); *F16B 2/06* (2013.01)

(58) Field of Classification Search
CPC .... A47C 31/00; A47C 1/124; Y10T 24/3444; Y10T 403/7141
USPC .......................................................... 297/248
See application file for complete search history.

(56) References Cited

U.S. PATENT DOCUMENTS

| | | | | |
|---|---|---|---|---|
| 1,198,726 A * | 9/1916 | Huntley ................. | A47C 1/124 | 297/248 |
| 1,934,396 A * | 11/1933 | Bales ..................... | A47C 1/124 | 24/339 |
| 2,637,081 A * | 5/1953 | Henrikson ............. | A47C 1/124 | 297/248 |
| 2,750,990 A * | 6/1956 | Eves ..................... | A47C 1/124 | 24/335 |
| 2,821,762 A * | 2/1958 | Foose .................... | A47C 1/124 | 24/115 G |
| 3,188,138 A * | 6/1965 | Lockshin ............... | A47C 1/124 | 108/64 |
| 3,207,551 A * | 9/1965 | Axtell ................... | A47B 91/06 | 297/248 |
| 3,227,487 A * | 1/1966 | Blanchard, Jr. ........ | A47C 1/124 | 108/64 |
| 3,291,523 A * | 12/1966 | Krueger ................. | A47C 1/124 | 297/239 |
| 3,314,718 A * | 4/1967 | Crandall ................ | A47C 1/124 | 297/239 |
| 3,383,738 A * | 5/1968 | Fox ........................ | A47C 1/124 | 24/306 |
| 3,669,491 A * | 6/1972 | Weslock ................ | A47C 1/124 | 24/339 |
| 3,825,300 A * | 7/1974 | Lieberman ............. | A47C 1/124 | 297/248 |
| 4,066,373 A * | 1/1978 | Workman .............. | A47C 1/124 | 24/339 |
| 4,224,721 A * | 9/1980 | Ohlson .................. | F16B 7/0433 | 24/376 |
| 5,542,159 A * | 8/1996 | Schultz ................. | A47C 1/124 | 24/341 |
| D392,180 S * | 3/1998 | Bilow ............................ | D8/382 | |
| 5,957,530 A * | 9/1999 | Gutgsell ................ | A47C 1/124 | 297/232 |
| 7,111,902 B1 * | 9/2006 | Conner .................. | A47C 7/58 | 297/248 |

(Continued)

FOREIGN PATENT DOCUMENTS

TW   M328232 U   3/2008

*Primary Examiner* — Robert J Sandy
*Assistant Examiner* — Matthew Sullivan
(74) *Attorney, Agent, or Firm* — Rabin & Berdo, P.C.

(57) ABSTRACT

A fixing device includes an encircle element having lateral sides and two flap portions extending outwardly from the lateral sides and formed with a through hole; a positioning element fixed securely to the encircle element and having lateral sides extending parallel to the lateral sides of the encircle element so as to define restriction chambers, wherein one lateral side of the positioning element has a longitudinal length greater than the lateral sides of the encircle element and is formed with an upward notch; and a locking plate having a first end connected pivotally to the through hole in the encircle element and a second end formed with a downward notch such that the locking plate is pivotable relative to the encircle element between an unlocked position, in which the notches disengage relative to each other and a locking position, in which the notches engages relative to each other.

3 Claims, 8 Drawing Sheets

(56) References Cited

U.S. PATENT DOCUMENTS

| | | | |
|---|---|---|---|
| 7,607,733 B1* | 10/2009 | Lin | A47C 1/124 297/248 |
| 2005/0012371 A1* | 1/2005 | Mendenhall | A47C 3/04 297/248 |
| 2007/0210631 A1* | 9/2007 | Berning | A47C 13/005 297/248 |
| 2009/0152919 A1* | 6/2009 | Lin | A47C 1/124 297/248 |
| 2010/0176634 A1* | 7/2010 | Wahl | A47C 13/005 297/248 |
| 2012/0013156 A1* | 1/2012 | Tsai | A47C 3/04 297/248 |
| 2012/0286551 A1* | 11/2012 | Kumazawa | A47C 1/124 297/248 |
| 2014/0152059 A1* | 6/2014 | Swy | A47C 7/62 297/188.01 |

* cited by examiner

FIXING DEVICE FOR CHAIRS

BACKGROUND OF THE INVENTION

1. Field of the Invention

The present invention relates generally to a fixing device, and more particularly to a fixing device for chairs, especially for connecting and fixing an adjacent pairs of chairs or a row of chairs so that the row of chairs extends along a straight line.

2. The Prior Arts

In an assembly hall or a baseball stadium, pluralities of foldable chairs or seats are arranged in rows in order to permit seating of audience for watching a game or match. During the chair arrangement, after unfolding each independent chair, the adjacent pairs of chairs are coupled together via a connector or fixing device such that only a relatively small space is left between the adjacent pair of chairs. Under this condition, it may cause discomfort to the seated persons if at least one of them is fat or hefty. To eliminate the above drawback, the chairs should be arranged independently and individually so as to permit appropriate gap between adjacent two chairs, however this may lead to overall unevenness of the chairs.

Taiwan Patent No. M328232 discloses a chair spacer to be utilized between two adjacent chairs to provide an expansion space between the chairs. The chair spacer includes a frame body having a first engagement post and a fastening element with an engaging hole having a narrow hole section. One foldable chair has a front leg formed with a locking plate with a hole having a narrow hole section while another foldable chair has a second engagement post. For coupling the two chairs, the first engagement post is inserted through the locking plate deep into the narrow hole section of the hole, after which the fastening element is rotated in such a manner to so as to abut the other end tightly against the front leg of one chair. Then, the second engagement post of another chair is inserted through a hole in the frame body so as to abut against the narrow hole section of the hole, hence the two chairs are coupled together by the frame body and leaving an appropriate space between the chairs.

One drawback resulted from the use of the chair spacer disclosed according to the above patent, some locking plates with through hole having the narrow hole section must be welded on the sides of the chairs, thereby causing inconvenient to the user, and hence resulting in high manufacturing expense.

SUMMARY OF THE INVENTION

A primary objective of the present invention is to provide a fixing device for chair, which is simple in structure and which does not required any additional machining conducted on the chairs so as to reduce the manufacturing expense thereof.

Another objective of the present invention to provide a fixing device that includes a generally U-shaped encircle element, a generally U-shaped positioning element disposed with the encircle element in such a manner that lateral sides of the encircle and positioning elements cooperatively define two restriction chambers and a locking plate connected pivotally to one side of the encircle element. The locking plate has a downwardly open notch for detachably engaging an upwardly open notch formed in the positioning element such that once two chairs are disposed side by side, the adjacent front or rear legs are respectively received within the restriction chambers. Then, the locking plate is rotated relative to the encircle element so as to engage the notches relative to each other, thereby preventing the chairs from being separated or preventing the respective chair from being moved away relative to its initial position.

The fixing device of the present invention for fixing two adjacent chairs, includes: an encircle element having left and right lateral sides and left and right flap portions extending outwardly from distal ends of the lateral sides and formed respectively with a through hole; a positioning element fixed securely to the encircle element in such a manner that the position element is disposed between the left and lateral sides, having left and right lateral sides extending parallel to the left and right lateral sides of the encircle element so as to define left and right restriction chambers between adjacent pairs of the left and right lateral sides of the encircle and positioning elements, wherein one of the lateral sides of the positioning element has a longitudinal length greater than both of the lateral side of the encircle element and is formed with an upwardly open notch; a locking plate having a first end connected pivotally to the through hole in the flap portion of the encircle element via a rivet and a second end that is opposite to the first end and that is formed with a downwardly open notch complementing with the upwardly open notch such that the locking plate is pivotable relative to the encircle element between an unlocked position, in which the locking plate rotates about the rivet so as to move away from the encircle element and hence disengaging the notches relative to each other and a locking position, in which the locking plate rotates about the rivet so as to move toward the encircle element and hence engaging the notches relative to each other so as to prevent disengagement of the locking plate from the positioning element.

In one embodiment of the present invention, the encircle element is a generally U-shaped integral piece, has an intermediate portion interconnected the left and right lateral sides thereof, the flap portion is formed by bending partially a respective one of the left and right lateral sides.

In one embodiment of the present invention, the positioning element is a generally U-shaped integral piece, has an intermediate portion interconnected the left and right lateral sides thereof, the other one of the left and right lateral sides of the positioning element having a longitudinal length smaller than both of the lateral side of the encircle element so as not to interfere with the pivotal action of the locking plate between the locking and unlocked positions.

One aspect of the present invention is that the dimension or size of the fixing device of the present invention should not be limited only the disclosed embodiments, but should encompass various sizes and dimension according to the requirements of the chairs.

Since the fixing device of the present invention is constructed according to the requirement of the applications, the front or the rear legs of adjacent pairs of chairs can be connected together by the fixing device of the present invention and hence the chairs can be arranged in a straight line or in a curved line according to the requirement of the stadium or hall, in which the chairs are used.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENTS

The accompanying drawings are included to provide a further understanding of the invention, and are incorporated in and constitute a part of this specification. The drawings illustrate embodiments of the invention and, together with the description, serve to explain the principles of the invention.

Figure 1:
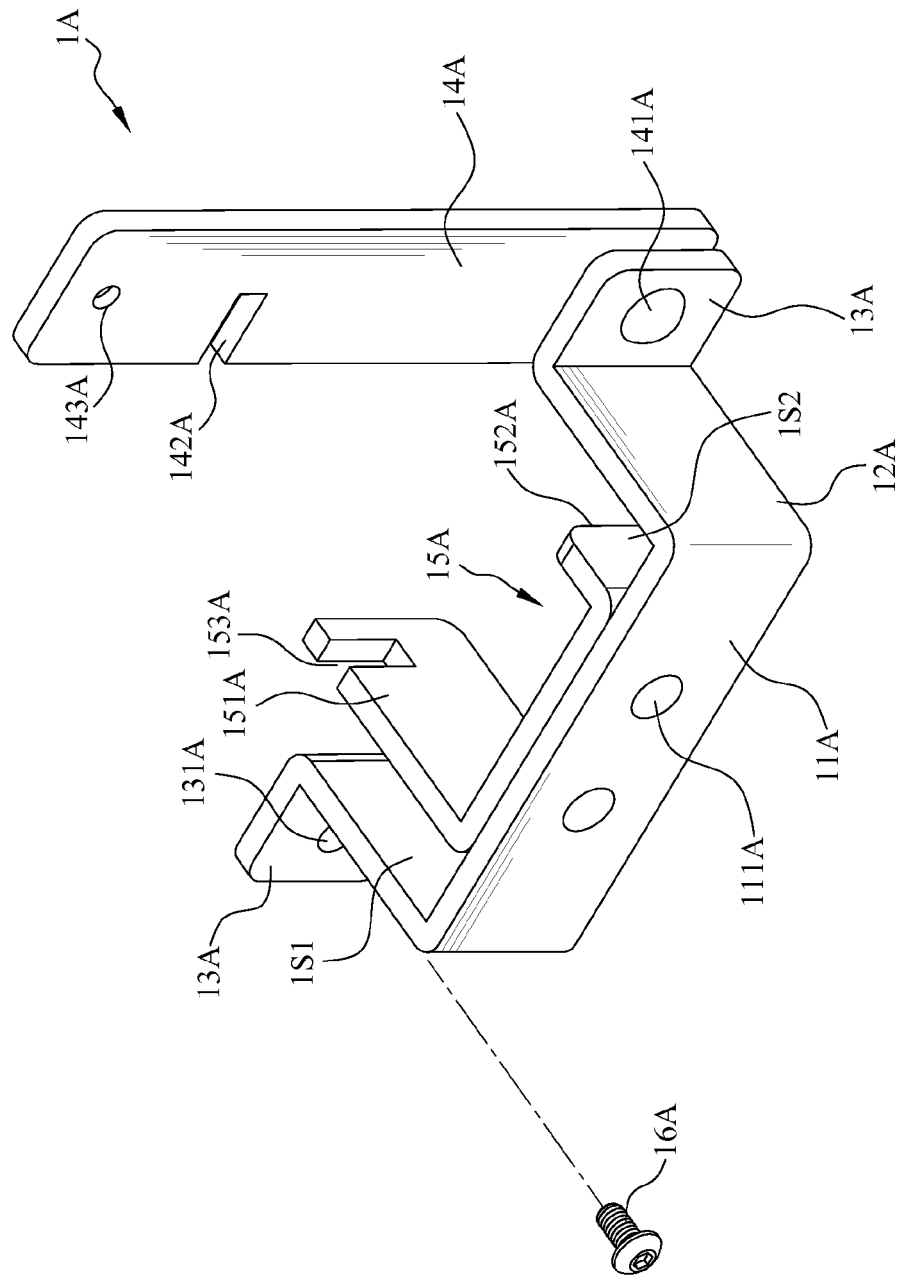
FIG. 1 is a perspective view of a chair fixing device according to a first embodiment of the present invention, wherein a locking plate of the fixing device is shown in an unlocked position relative to an encircle element.

FIG. 1 is a perspective view of a chair fixing device 1A according to a first embodiment of the present invention, wherein a locking plate of the fixing device is shown in an unlocked position relative to an encircle element. The fixing device 1A of the present invention includes an encircle element 11A, a positioning element 15A and a locking plate 14A. The encircle element 11A is made from metal by bending an elongated metal plate having an appropriate thickness and is a generally U-shaped integral piece. The encircle element 11A has left and right lateral sides 12A and left and right flap portions 13A extending outwardly from distal ends of the lateral sides 12A and formed respectively with a through hole 131A. Preferably, the encircle element 11A has an intermediate portion interconnecting the left and right lateral sides 12A thereof, the flap portion 13A is formed by bending partially a respective one of the left and right lateral sides 12A.

The positioning element 15A is a generally U-shaped integral piece, and is made from metal by bending an elongated metal plate having an appropriate thickness. The positioning element 15A is fixed securely to the encircle element 11A in such a manner that the position element is 15A is disposed between the left and lateral sides 12A. The positioning element 15A has left and right lateral sides 151A, 152A extending parallel to the left and right lateral sides 12A of the encircle element 11A so as to define left and right restriction chambers 1S1, 1S2 between adjacent pairs of the left and right lateral sides 12A, 151A, 152A of the encircle and positioning elements 11A, 15A, wherein one lateral side 151A of the positioning element 15A has a longitudinal length greater than both of the lateral sides 12A of the encircle element 11A. The lateral side 151A of the positioning element 15A is formed with an upwardly open notch 153A, the purpose of which will be explained in the following paragraphs. Preferably, the positioning element 15A has an intermediate portion that interconnects the lateral sides 151A, 152A and that is fixed to the intermediate portion of the encircle element 11A via the fastener screw 111A or welding means can be implemented for coupling the positioning element 15A relative to the encircle element 11A.

Figure 2:
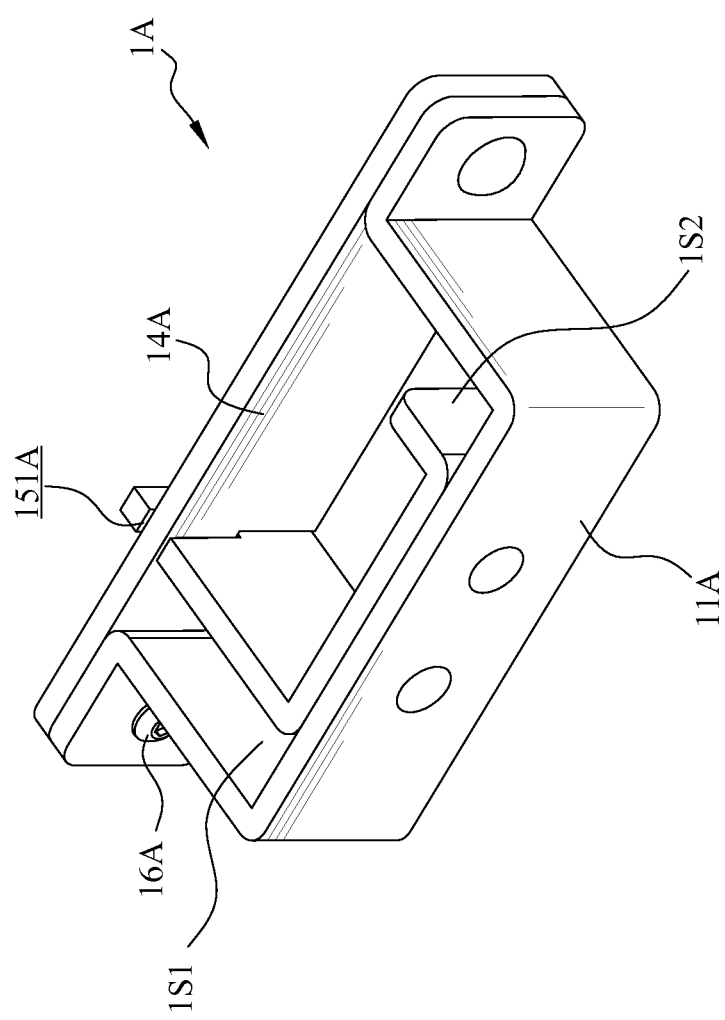
FIG. 2 is a perspective view of the chair fixing device according to the first embodiment of the present invention, wherein the locking plate of the fixing device is shown in a locked position relative to the encircle element.

The locking plate 14A is an elongated metal plate having an appropriate thickness. The locking plate 14A has a first end 141A connected pivotally to the through hole 131A in the flap portion 13A of the encircle element 11A via a rivet and a second end that is opposite to the first end and that is formed with a downwardly open notch 142A complementing with the upwardly open notch 153A such that the locking plate 14A is pivotable relative to the encircle element 11A between an unlocked position (see FIG. 1), in which the locking plate 14A rotates about the rivet so as to move away from the encircle element 11A and hence disengaging the notches 142A, 153A relative to each other, and a locking position (see FIG. 2), in which the locking plate 14A rotates about the rivet so as to move toward the encircle element 11A and hence engaging the notches 142A, 153A relative to each other so as to prevent disengagement of the locking plate 11A from the positioning element 15A. Preferably, the second end of the locking plate 14A is further formed with a screw hole 143A outbound to the downwardly open notch 142A such that the screw hole 143A is adapted to be aligned with the through hole 131A in the flap portion 13A of the encircle element 11*a* in case the locking plate 14A is at the locked position. At this time, a fastener screw 16A (see FIG. 1) can be inserted through the hole 131A and is fastened threadedly to the screw hole 143A, thereby providing additional engagement between the encircle element 11A and the positioning element 15A.

Figure 3:
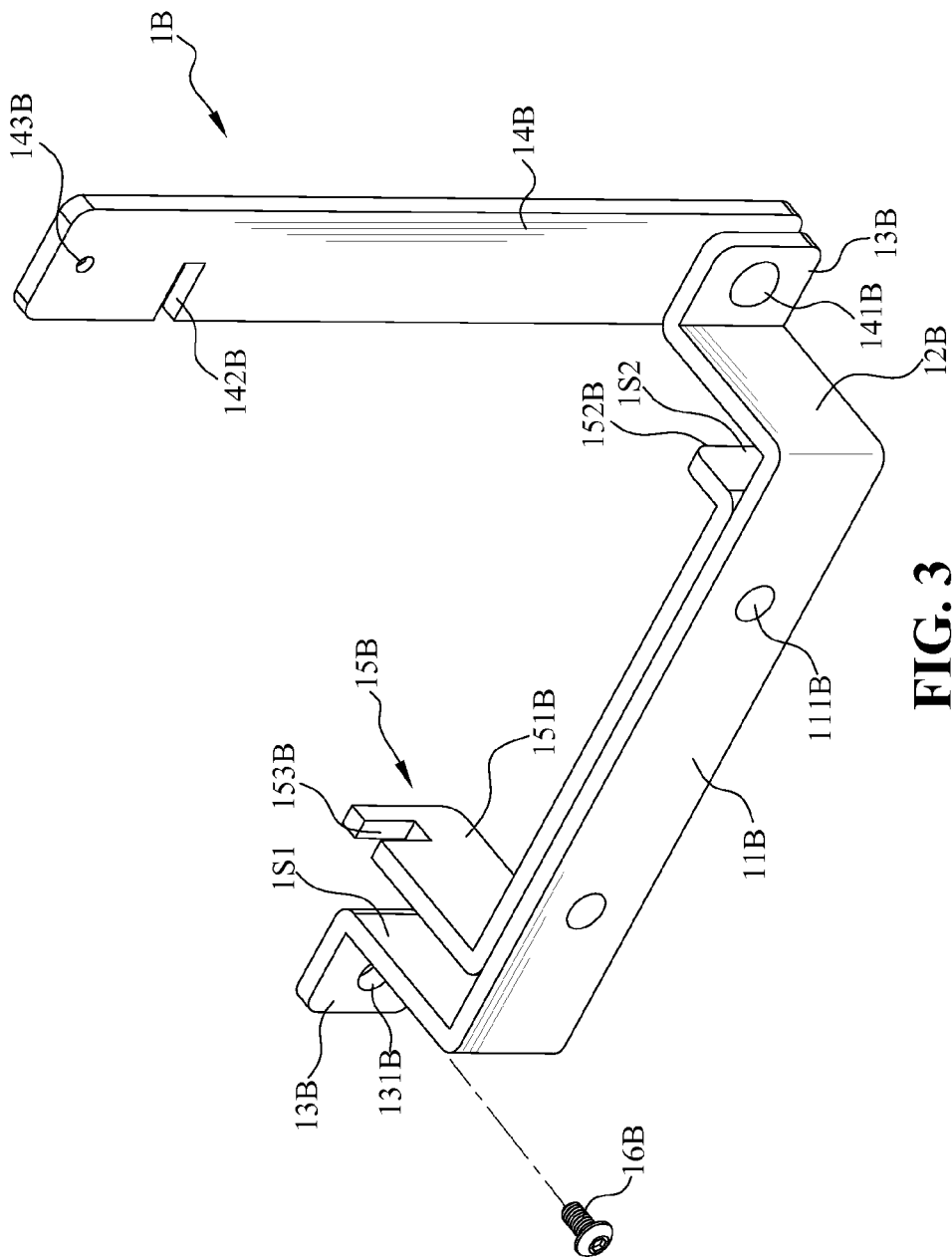
FIG. 3 is a perspective view of a chair fixing device according to a second embodiment of the present invention, wherein the locking plate of the fixing device is shown in an unlocked position relative to the encircle element.
Figure 4:
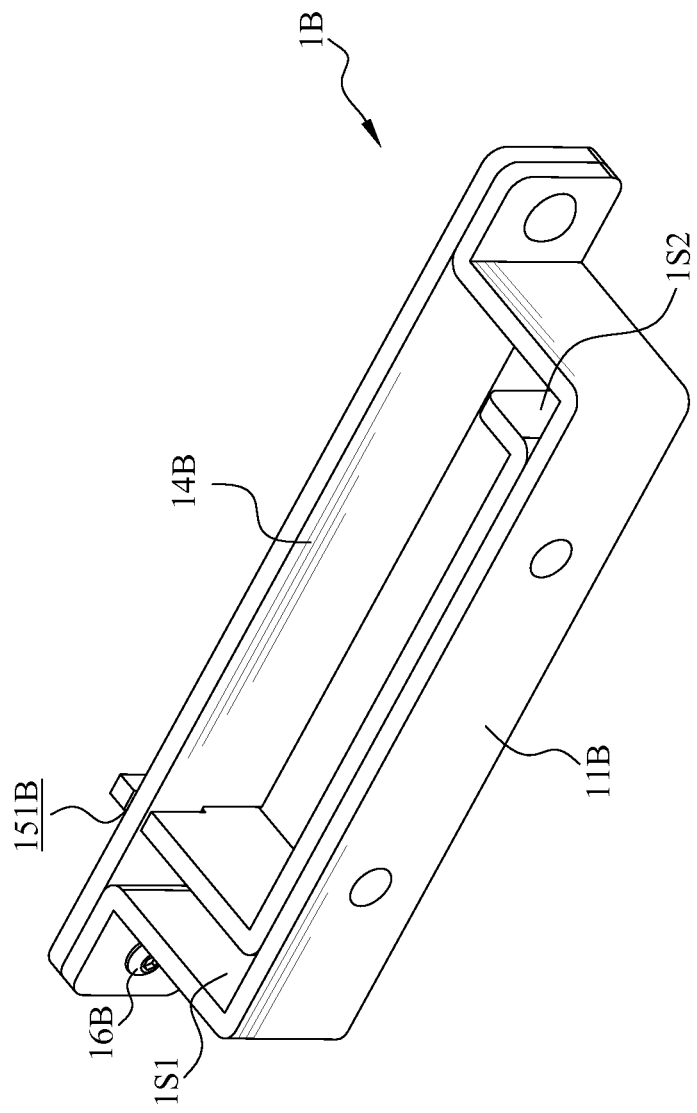
FIG. 4 is a perspective view of the chair fixing device according to the second embodiment of the present invention, wherein the locking plate of the fixing device is shown in a locked position relative to the encircle element.

FIG. 3 is a perspective view of a chair fixing device 1B according to a second embodiment of the present invention, wherein the locking plate of the fixing device 1B is shown in an unlocked position relative to the encircle element, and FIG. 4 is a perspective view of the chair fixing device 1B according to the second embodiment of the present invention, wherein the locking plate of the fixing device 1B is shown in a locked position relative to the encircle element. Note that the second embodiment is greater than the first embodiment in dimension. The second embodiment accordingly includes an encircle element 11B, a positioning element 15B and a locking plate 14B. The encircle element 11B is made from metal by bending an elongated metal plate having an appropriate thickness and is a generally U-shaped integral piece. The encircle element 11B has left and right lateral sides 12B and left and right flap portions 13B extending outwardly from distal ends of the lateral sides 12B and formed respectively with a through hole 131B. Preferably, the encircle element 11B has an intermediate portion interconnecting the left and right lateral sides 12B thereof, the flap portion 13B is formed by bending partially a respective one of the left and right lateral sides 12B.

The positioning element 15B is a generally U-shaped integral piece, and is made from metal by bending an elongated metal plate having an appropriate thickness. The positioning element 15B is fixed securely to the encircle element 11B in such a manner that the position element 15B is disposed between the left and lateral sides 12B of the encircle element 11B. The positioning element 15B has left and right lateral sides 151B, 152B extending parallel to the left and right lateral sides 12B of the encircle element 11B so as to define left and right restriction chambers 1S1, 1S2 between adjacent pairs of the left and right lateral sides 12B, 151B, 152B of the encircle and positioning elements 11B, 15B, wherein one lateral side 151B of the positioning element 15B has a longitudinal length greater than both of the lateral sides 12B of the encircle element 11B. The lateral side 151B of the positioning element 15B is formed with an upwardly open notch 153B, the purpose of which will be explained in the following paragraphs. Preferably, the positioning element 15B has an intermediate portion that interconnects the lateral sides 151B, 152B and that is fixed to the intermediate portion of the encircle element 11B via the fastener screw 111B or welding means can be implemented for coupling the positioning element 15B relative to the encircle element 11B.

The locking plate 14B is an elongated metal plate having an appropriate thickness. The locking plate 14B has a first end 141B connected pivotally to the through hole 131B in the flap portion 13B of the encircle element 11B via a rivet and a second end that is opposite to the first end and that is formed with a downwardly open notch 142B complementing with the upwardly open notch 153B such that the locking plate 14B is pivotable relative to the encircle element 11B between an unlocked position (see FIG. 3), in which the locking plate 14B rotates about the rivet so as to move away from the encircle element 11B and hence disengaging the notches 142B, 153B relative to each other, and a locking position (see FIG. 4), in which the locking plate 14B rotates about the rivet so as to move toward the encircle element 11B and hence engaging the notches 142B, 153B relative to each other so as to prevent disengagement of the locking plate 11B from the positioning element 15B. Preferably, the second end of the locking plate 14B is further formed with a screw hole 143B outbound to the downwardly open notch 142B such that the screw hole 143B is adapted to be aligned with the through hole 131B in the flap portion 13B of the encircle element 11B in case the locking plate 14B is at the locked position. At this time, a fastener screw 16B (see FIG. 3) can be inserted through the hole 131B and is fastened threadedly to the screw hole 143B, thereby providing additional engagement between the encircle element 11B and the positioning element 15B. More preferably, the other lateral side 152A of the positioning element 15A has a longitudinal length smaller than both of the lateral sides 12A of the encircle element 11A so as not to interfere pivotal action of the locking plates 14A relative to the encircle element 11A when rotating to the unlocked and locking positions.

It is noted that in a foldable chair, since the front and rear legs are connected pivotally via a pivot or pin at the middle portions thereof so that once a pair of chairs are in use, an adjacent pair of the front legs defines a gap smaller than the gap defined by an adjacent pair of the rear legs. Owing to this reason, the fixing device 1A or 1B constructed according to the first and second embodiments is used to arrange the chairs in a straight line or in a curved line.

Figure 5:
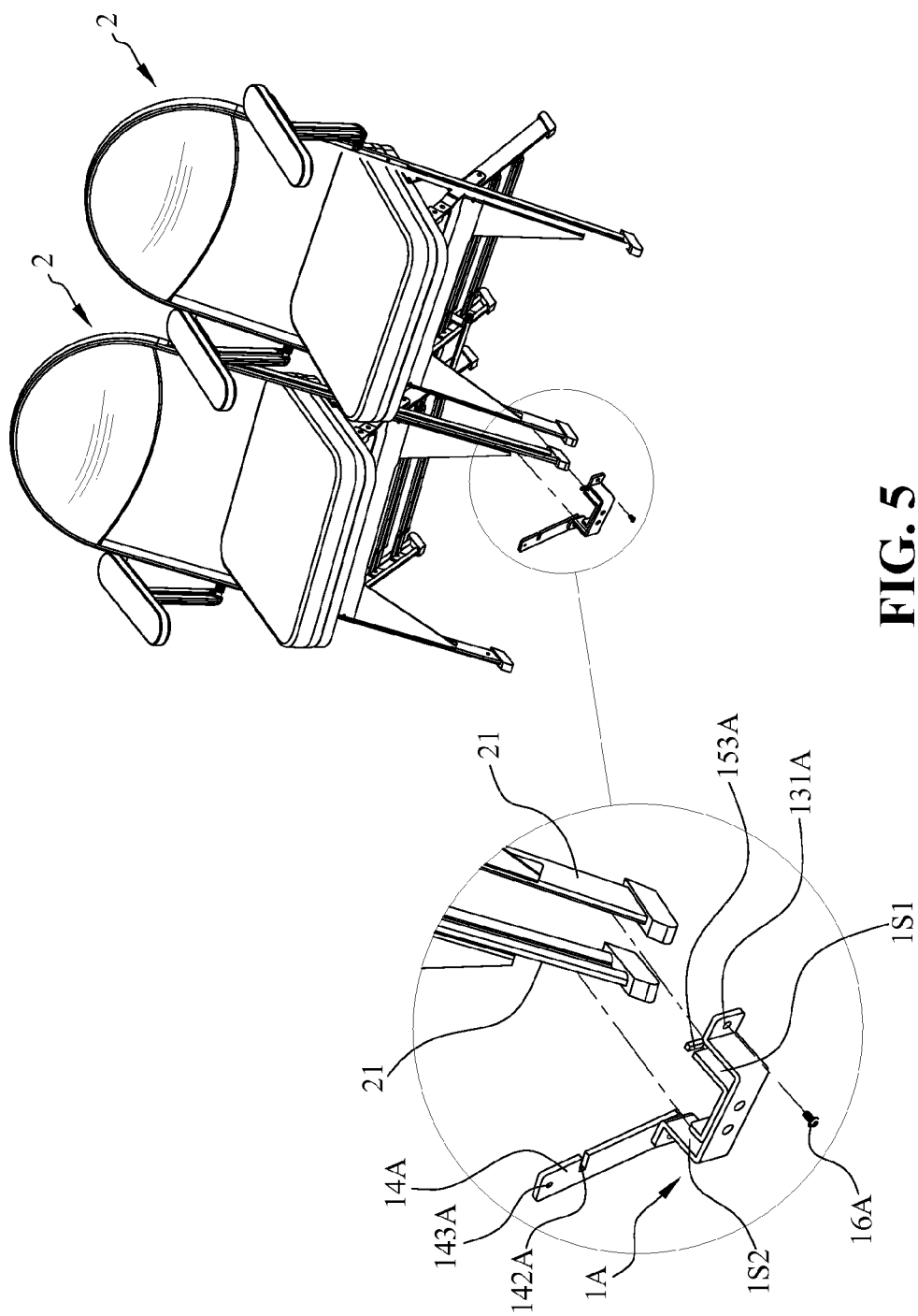
FIG. 5 shows the fixing device according to the first embodiment of the present invention, which fixes two front legs of an adjacent pair of chairs.

FIG. 5 shows the fixing device 1A according to the first embodiment of the present invention, which fixes two front legs 21 of an adjacent pair of chairs 2. As shown, two chairs 2 are disposed side by side relative to each other but they are easily moved from their initial positions when no fixing device 1A of the present invention is implemented. To prevent the chairs from separating relative to each other, the fixing device 1A of the present invention is held with the locking plate 14A at the unlocked position, as best shown in the encircled portion of FIG. 5. The fixing device 1A is pushed against the adjacent pair of front legs 21 in such a manner that the front legs 21 are respectively received within the left and right restriction chamber 1S1, 1S2. After which, the locking plate 14A is rotated about the rivet so as to move toward the encircle element 11A and hence engaging the notches 142A, 153A relative to each other so as to prevent disengagement of the locking plate 11A from the positioning element 15A. At this time, a fastener screw 16A (see the encircled portion in FIG. 5) can be inserted through the hole 131A and is fastened threadedly to the screw hole 143A, thereby providing additional engagement to prevent disengagement of the front legs 21 of the chairs relative to each other.

Figure 6:
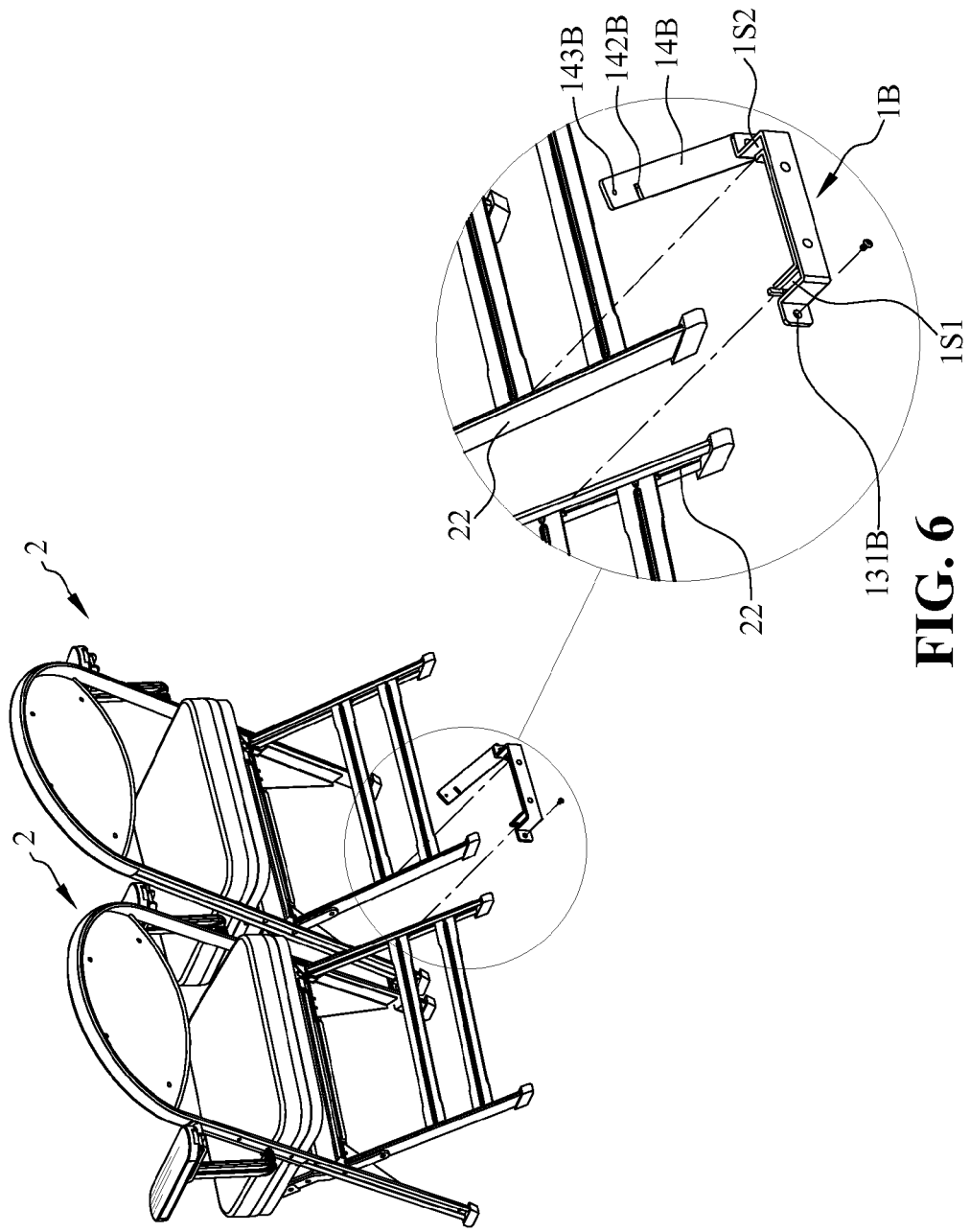
FIG. 6 shows the fixing device according to the second embodiment of the present invention, which fixes two rear legs of an adjacent pair of chairs.

FIG. 6 shows the fixing device 1B according to the second embodiment of the present invention, which fixes two rear legs 22 of an adjacent pair of chairs 2. As shown, since the gap between adjacent rear legs 22 of the chairs 2 is greater than the gap defined by an adjacent pair of the front legs 21, the fixing device 1B constructed according to the second embodiment is used herein. First of all, two chairs 2 are disposed side by side relative to each other but they are easily moved from their initial positions when no fixing device 1B of the present invention is implemented. To prevent the chairs 2 from separating relative to each other, the fixing device 1B of the present invention is held with the locking plate 14B at the unlocked position, as best shown in the encircled portion of FIG. 6. The fixing device 1B is pushed against the adjacent pair of rear legs 22 in such a manner that the rear legs 22 are respectively received within the left and right restriction chamber 1S1, 1S2. Then, the locking plate 14B is rotated about the rivet so as to move toward the encircle element 11B and hence engaging the notches 142B, 15BA relative to each other so as to prevent disengagement of the locking plate 11B from the positioning element 15B. At this time, a fastener screw (see the encircled portion in FIG. 6) can be inserted through the hole 131B and is fastened threadedly to the screw hole 143B in the locking plate 14B, thereby providing additional engagement to prevent disengagement of the rear legs 222 of the chairs 2 relative to each other.

Figure 7:
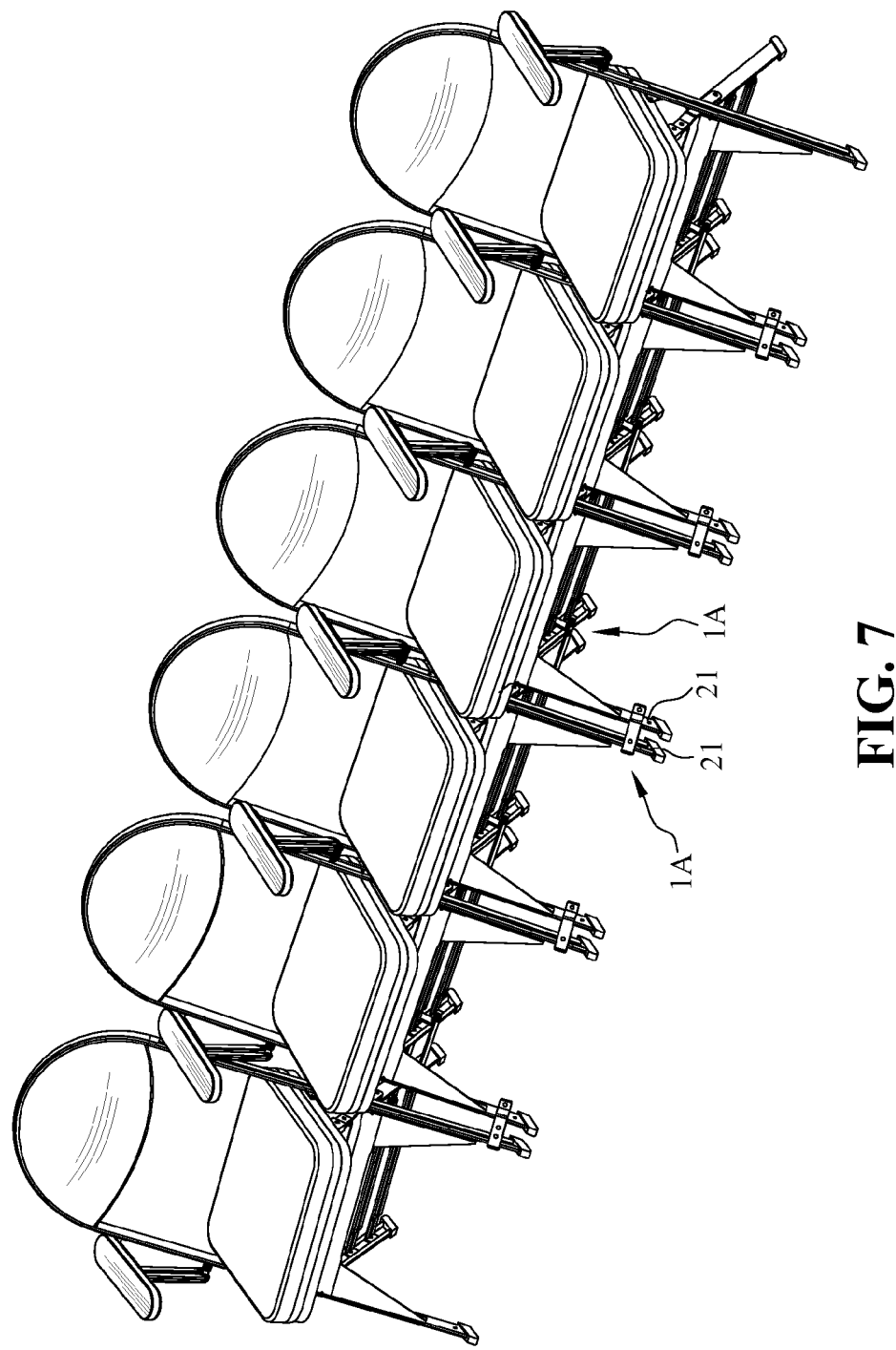
FIG. 7 shows the fixing devices according to the first embodiment of the present invention, which fix front and rear legs of adjacent pairs of chairs such that a row of chairs extends in a straight line.

One aspect of the present invention is that the dimension or size of the fixing device of the present invention should not be limited only the disclosed embodiments, but should encompass various sizes and dimension according to actual desires. For instance, FIG. 7 shows the fixing devices 1A according to the first embodiment of the present invention, which fix front and rear legs of adjacent pairs of chairs 2 such that a row of chairs 2 extends in a straight line, which is generally arranged in an assembly hall or class rooms.

Figure 8:
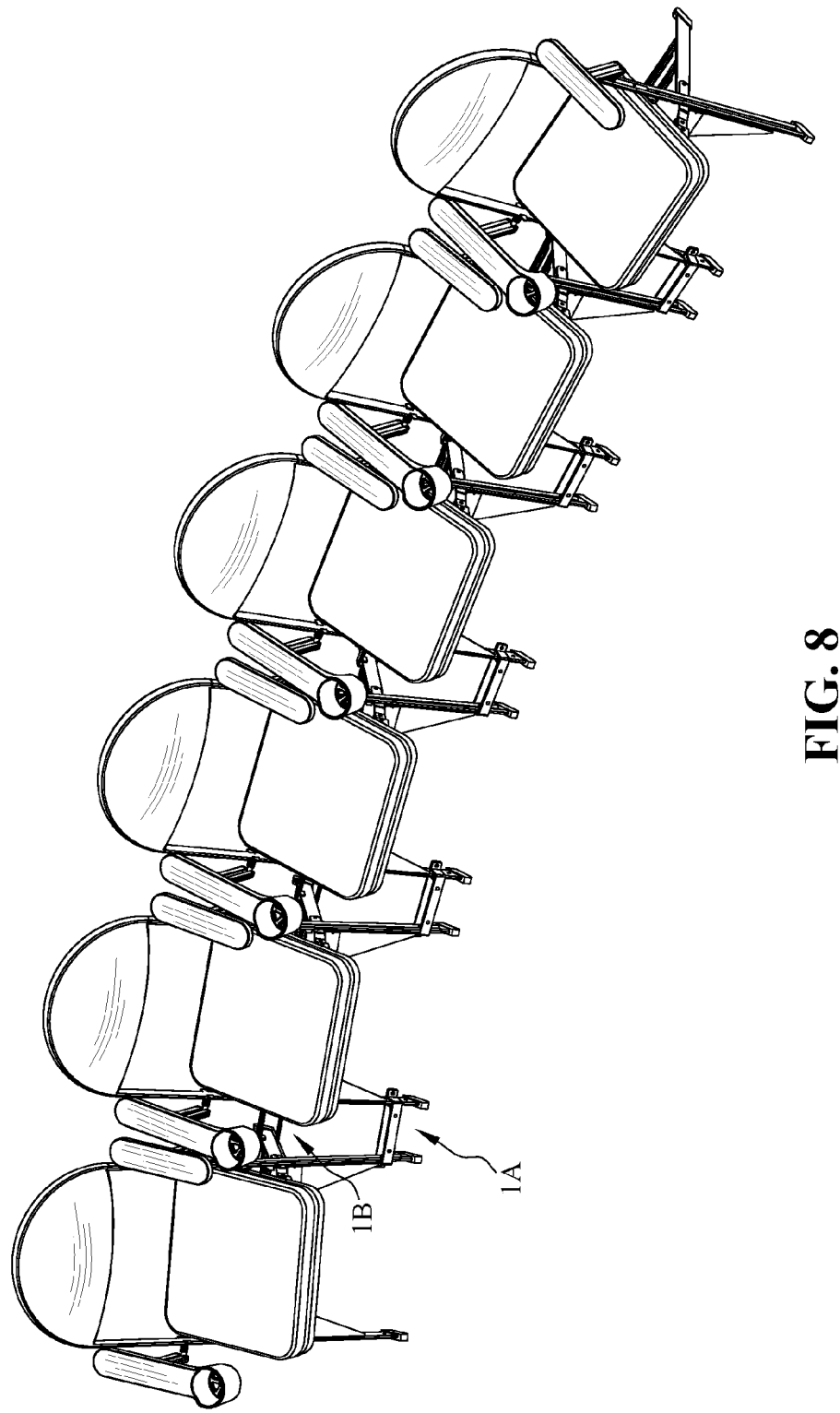
FIG. 8 shows the fixing devices according to the first and second embodiments of the present invention, which fix front and rear legs of adjacent pairs of chairs, respectively, such that a row of chairs extends in a curved line.

Alternately, FIG. 8 shows the fixing devices 1A, 1B according to the first and second embodiments of the present invention, which fix front and rear legs of adjacent pairs of chairs 2, respectively, such that a row of chairs 2 extends generally in a curved line, which is preferably arranged in a relatively large stadium or arena.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A chair fixing device for fixing two adjacent chairs, comprising:
   an encircle element having left and right lateral sides and left and right flap portions extending outwardly from distal ends of said lateral sides and formed respectively with a through hole;
   a positioning element fixed securely to said encircle element in such a manner that said position element is disposed between said left and lateral sides, having left and right lateral sides extending parallel to said left and right lateral sides of said encircle element so as to define left and right restriction chambers between adjacent pairs of said left and right lateral sides of said encircle and positioning elements, wherein one of said lateral sides of said positioning element has a longitudinal length greater than both of said lateral side of said encircle element and is formed with an upwardly open notch; and a locking plate having a first end connected pivotally to said through hole in said flap portion of said encircle element via a rivet and a second end that is opposite to said first end and that is formed with a downwardly open notch complementing with said upwardly open notch such that said locking plate is pivotable relative to said encircle element between an unlocked position, in which said locking plate rotates about said rivet so as to move away from said encircle element and hence disengaging said notches relative to each other and a locking position, in which said locking plate rotates about said rivet so as to move toward said encircle element and hence engaging said notches relative to each other so as to prevent disengagement of said locking plate from said positioning element.

2. The chair fixing device according to claim 1, wherein said encircle element is a generally U-shaped integral piece, has an intermediate portion interconnecting said left and right lateral sides thereof, said flap portion is formed by bending partially a respective one of said left and right lateral sides.

3. The chair fixing device according to claim 2, wherein said positioning element is a generally U-shaped integral piece, has an intermediate portion interconnecting said left and right lateral sides thereof, the other one of said left and right lateral sides of said positioning element having a longitudinal length smaller than both of said lateral side of said encircle element.

* * * * *